United States Patent
Jicrapipalanakul et al.

(10) Patent No.: US 6,678,114 B2
(45) Date of Patent: Jan. 13, 2004

(54) DISC BIASING SCHEME TO MINIMIZE SINGLE PLANE UNBALANCE FOR HARD DISC DRIVES

(75) Inventors: Niroot Jicrapipalanakul, Singapore (SG); Victor Chi Siang Choo, Singapore (SG); Poh Lye Lim, Singapore (SG); Michael Joo Chiang Toh, Singapore (SG); Kwee Teck Say, Singapore (SG); Beng Wee Quak, Singapore (SG); Chee Suan Low, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/785,670

(22) Filed: Feb. 16, 2001

(65) Prior Publication Data

US 2003/0063412 A1 Apr. 3, 2003

Related U.S. Application Data

(60) Provisional application No. 60/184,929, filed on Feb. 25, 2000.

(51) Int. Cl.[7] .............................. G11B 25/04; G01M 1/30
(52) U.S. Cl. .................................. 360/99.08; 360/98.08; 360/99.12; 360/98.07; 73/468
(58) Field of Search ............................... 29/603.03, 759, 29/729, 732, 737, 757, 760; 74/573 R; 310/51; 369/264, 266, 263, 267; 360/99.08, 99.12, 98.01, 98.07, 98.08; 73/468

(56) References Cited

U.S. PATENT DOCUMENTS

| | | |
|---|---|---|
| 3,817,088 A | 6/1974 | Herbig |
| 4,683,505 A * | 7/1987 | Schmidt et al. ......... 360/98.08 |
| 4,739,425 A | 4/1988 | Dierkes et al. |
| 4,933,927 A | 6/1990 | Ross |
| 5,043,973 A | 8/1991 | Ocheltree et al. |
| 5,130,870 A | 7/1992 | Jabbari |
| 5,572,382 A | 11/1996 | Kuno |
| 5,621,588 A * | 4/1997 | Williams et al. ......... 360/98.07 |
| 5,811,678 A | 9/1998 | Hirano |
| 5,825,746 A | 10/1998 | Lee |
| 6,158,112 A * | 12/2000 | Kim et al. ..................... 29/759 |
| 6,288,867 B1 * | 9/2001 | Jierapipatanakul et al. ...... 360/98.08 |
| 6,356,409 B1 * | 3/2002 | Price et al. ............... 360/98.07 |
| 2002/0191332 A1 * | 12/2002 | Elsing ..................... 360/99.08 |

FOREIGN PATENT DOCUMENTS

| | | | | |
|---|---|---|---|---|
| JP | 61104366 A | * | 5/1986 | ........... G11B/19/20 |
| JP | 61165874 A | * | 7/1986 | ........... G11B/25/04 |
| JP | 62050636 A | * | 3/1987 | .......... G01M/01/30 |
| JP | 63299374 A | * | 12/1988 | ........... H01L/27/14 |
| JP | 02198058 A | * | 8/1990 | ......... G11B/17/028 |
| JP | 06342578 A | * | 12/1994 | ........... G11B/25/04 |
| JP | 10208375 A | * | 8/1998 | ........... G11B/19/20 |
| JP | 11110898 A | * | 4/1999 | ........... G11B/19/20 |

OTHER PUBLICATIONS

"Disk Pack Balancing," Jun. 1, 1989, IBM Technical Disclosure Bulletin, vol. No. 32, Iss. No. 1, p. 213.*
"Contamination–Free Balancing of Spindle/Hub Motors," Oct. 1, 1989, IBM Technical Disclosure Bulletin, vol. No. 32, Iss. No. 5B, pp. 333–334.*

* cited by examiner

Primary Examiner—William Klimowicz
(74) Attorney, Agent, or Firm—Mitchell K. McCarthy

(57) ABSTRACT

A method for minimizing unbalance in the disc pack of a disc drive where the unbalance of the spindle motor is quantified and incorporated into the biasing assembly of the disc pack. In the assembly process, the discs are biased in a manner such that the unbalance of the spindle motor is considered.

6 Claims, 5 Drawing Sheets

DISC BIASING SCHEME TO MINIMIZE SINGLE PLANE UNBALANCE FOR HARD DISC DRIVES

RELATED APPLICATIONS

This patent application claims priority from U.S. Provisional application No. 60/184, 929, filed Feb. 25, 2000.

FIELD OF THE INVENTION

The present invention relates generally to disc pack assembly in a disc drive, and more particularly to eccentricity correction of a number of discs mounted on a spindle motor such that vibration of the discs can be reduced during the read/write operation.

BACKGROUND OF THE INVENTION

A disc stack assembly usually has one or more discs mounted through the hub of a spindle motor. The spindle motor rotates the discs about an axis of rotation through the center of the hub at high speed to facilitate fast data retrieval and storage. Each disc has a number of circular tracks for storing data. A sensor, positioned above the tracks, moves radially across the tracks on a disc to retrieve or store data.

Any unbalance in the discs stack will induce vibrations in both planar and axial directions causing error in the sensor when reading and writing of data on the tracks. As the sensor is in close proximity to the disc surface, such vibrations may also result in the sensor crashing into the disc surface causing damage to the disc surface. In order to avoid such problems, various methods have been adopted. U.S. Pat. No. 4,683,505 issued on Jul. 28, 1987 to IBM for "Alternately Centered Disk Pack Assembly and Method" describes the use of alternately diametrically biasing discs in a disc stack assembly about the spindle axis of rotation. The discs are positioned as a function of outer edges such that alternated opposite outer edges of the discs line up as though they were the outer edges of centered nominal diameter discs.

Other prior art teaches the balancing method where the unbalance of the disc stack is measured and a mass of known weight is added to the disc stack to reduce the unbalance. U.S. Pat. No. 5,130,870 issued on Jul. 14, 1992 to Seagate Technology, Inc. is one such patent which teaches the use of epoxy adhesives and filler material of known density attached to the disc clamp to reduce unbalance in a disc pack. Although these prior art methods were able to reduce the planar vibrations by minimizing the unbalance contributed by the discs, the considerations in these methods does not include the contributing factor of unbalance in the spindle motor. Therefore, there remains a need for an improved method of reducing the unbalance in a disc pack where the unbalance of the spindle motor is taken into consideration together with the discs and the way in which they are mounted on the hub of the spindle motor.

It will be evident from the following description that the present invention offers this and other advantages in minimizing the unbalance forces and vibrations in a disc pack.

SUMMARY OF THE INVENTION

According to one aspect of the invention, there is provided a method to reduce unbalance in a disc pack. The disc pack having a spindle motor with a hub, a disc, a spacer and a disc clamp is assembled by the method such that the unbalance is minimized by incorporating a quantified unbalance of the spindle motor in the biasing process. The method comprises steps of creating a known unbalance on the spindle motor; and biasing the disc and the spacer to achieve an allowable unbalance with respect to the unbalance of the spindle motor. The step of creating the known unbalance further comprises the steps of demarcating the unbalance on the spindle motor; and determining the direction of the unbalance of the spindle motor. And the step of biasing the discs involve the optimization of the unbalance direction of the disc, spacer and the spindle motor using vector sum of each three components such that the resultant is within an allowable unbalance. In the method, the spindle motor has a feature to provide the orientation identification of the unbalance in the motor. The feature is used to locate the motor hub at a specific orientation during the biasing process.

In one embodiment of the invention, the feature is a hole in the spindle motor to provide a known unbalance.

In another embodiment of the invention, the feature is a marker on the spindle motor.

The allowable unbalance falls in the range of 30 mg.cm±15 mg.cm.

Another aspect of the invention provides a disc drive having a disc pack, the disc pack comprising of a spindle motor with a hub, at least one disc, at least one spacer; and a disc clamp. The spindle motor has a known unbalance incorporated into a biasing process to minimize the unbalance of the disc pack. The known unbalance is provided by drilling a hole in the spindle motor and demarcated with a feature to provide orientation identification. The feature locates the hub in a specific orientation during the biasing process. The known unbalance of the spindle motor falls directly opposite the feature within a range of ±30° about a line through the center of the hub and the feature.

In one embodiment of the invention, the feature is an indentation on the spindle motor.

The present invention provides a disc drive having a disc pack, the disc pack comprising a disc, a spacer and a spindle motor assembled by biasing the disc and spacer in directions determined by means of a vector sum equation of the unbalance of the spindle motor, spacer and disc.

These and various other features as well as advantages which characterize the present invention will be apparent upon reading of the following detailed description and review of the associated drawings.

DETAILED DESCRIPTION

Figure 1:
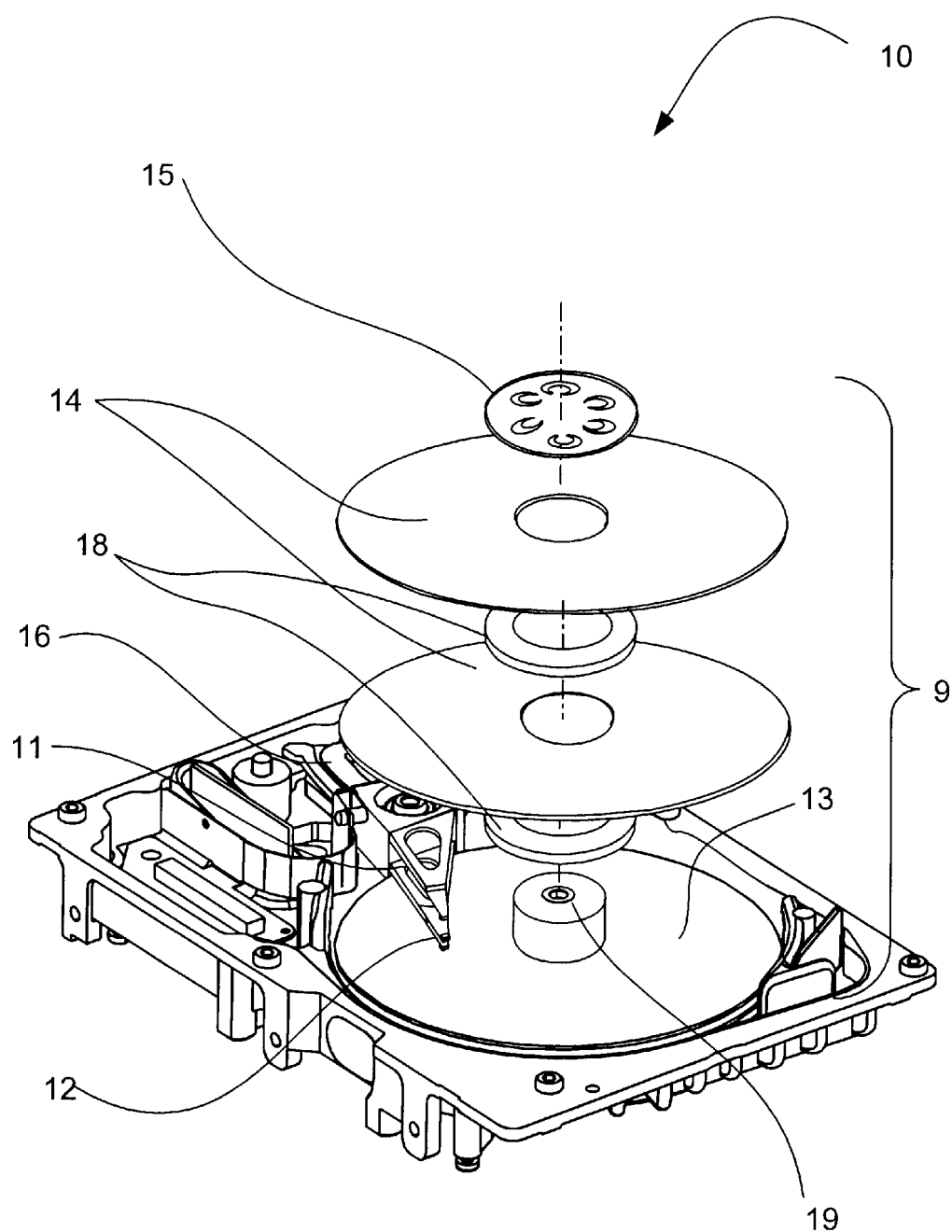
FIG. 1 is a perspective view of a typical disc drive.
Figure 2:
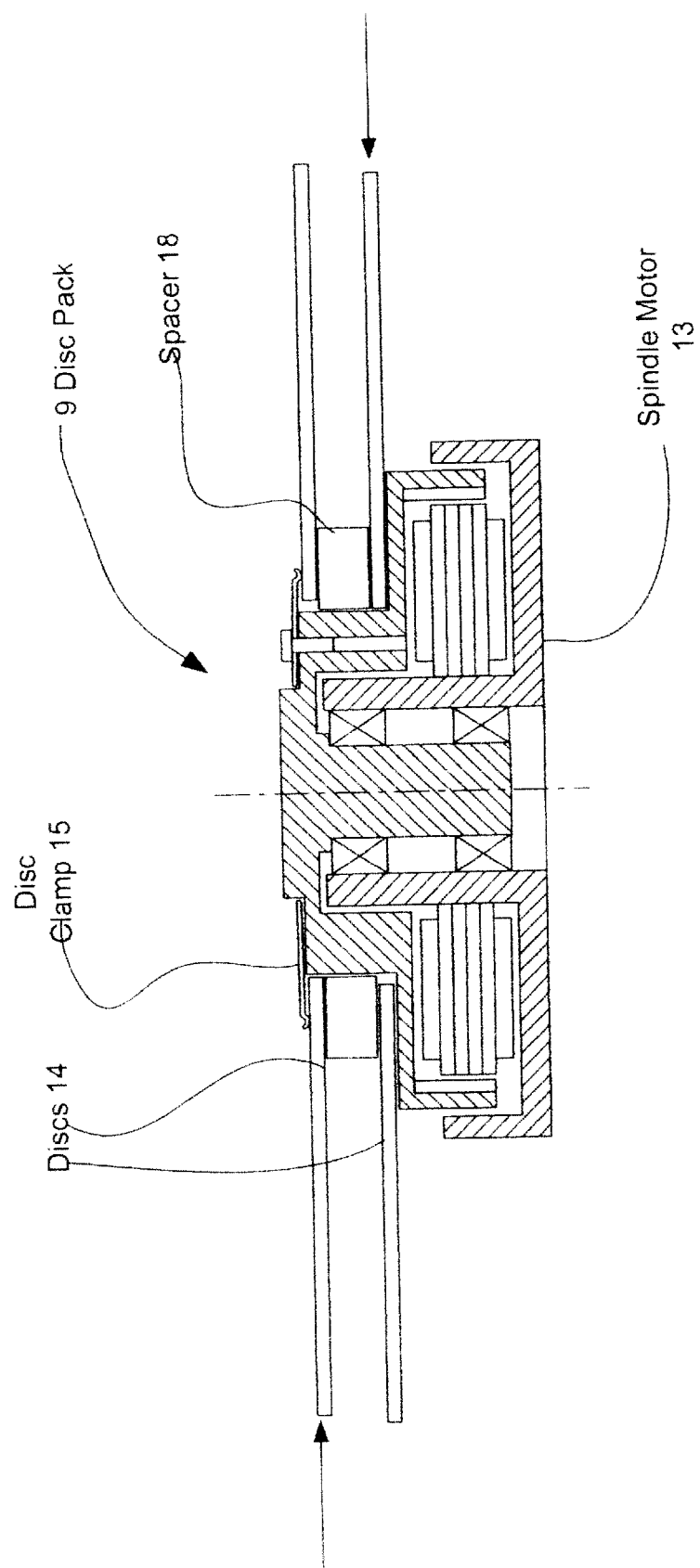
FIG. 2 is a cross-sectional view of a disc pack where the discs are diametrically biased.

FIG. 1 shows a perspective view of a typical disc drive 10 where a disc pack 9 is assembled to form a part of the disc drive 10. The disc pack 9 includes at least one disc 14, a disc clamp 15, a spindle motor 13. Other elements in the disc drive includes a transducer 12 to read and write data information on the tracks on a disc surface, the transducer is mounted on an actuator arm 11 which is driven by a voice coil motor 16 to move radially above the disc surface. FIG. 2 shows a cross-section of a disc pack 9 commonly used in disc drives, where the discs 14 are diametrically biased during assembly. The biasing is to minimize vibrations within the disc drive 10 due to the unbalance of the discs 14.

Figure 3:
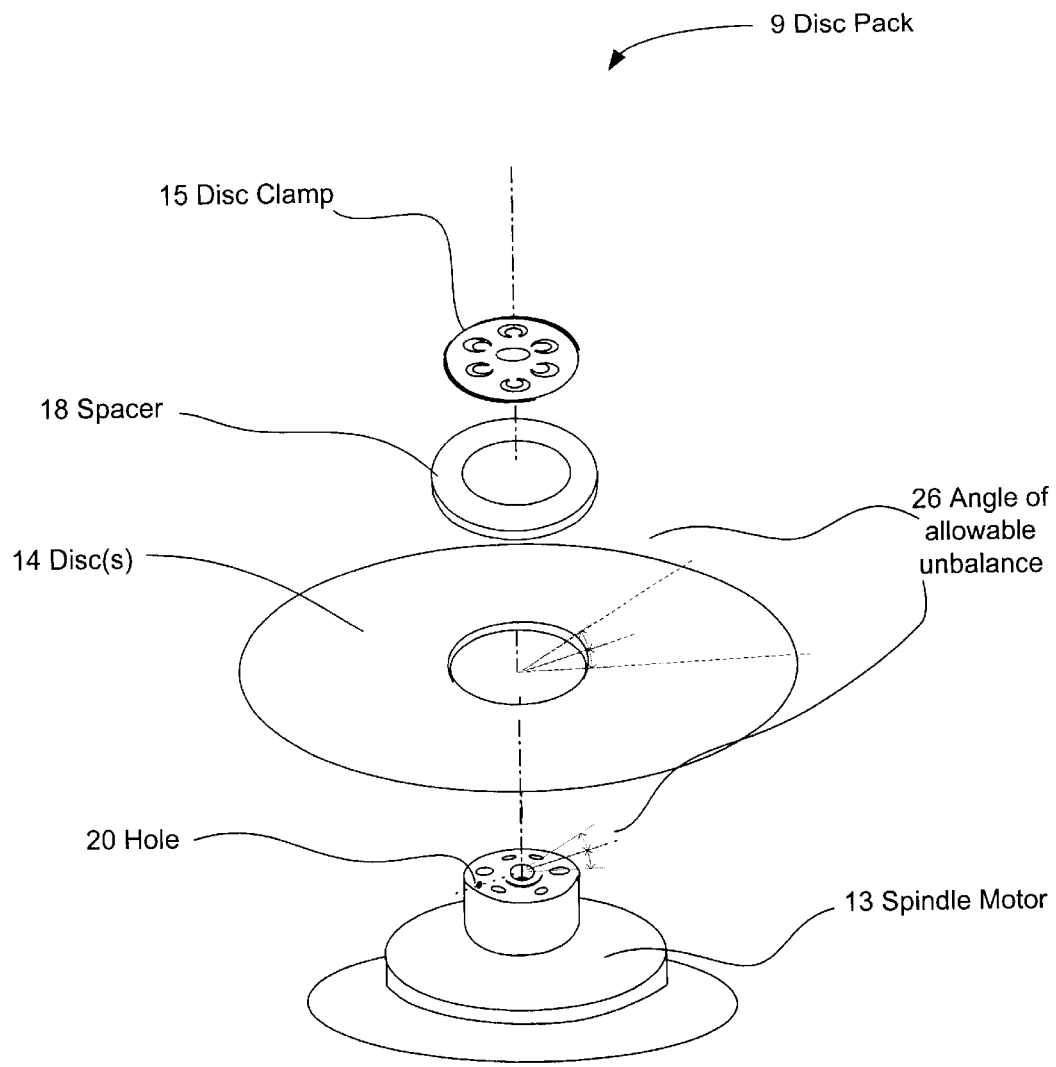
FIG. 3 is an exploded view of a disc pack of the present invention.

FIG. 3 shows an exploded view of a disc pack 9 of an embodiment of the current invention where two discs 14, one spacer 18, a spindle motor 13, a disc clamp 15 are assembled employing the biasing technique similar to that in FIG. 2. However, the present invention has a feature to determine the unbalance contributed by the spindle motor 13 which is not included in all prior art methods for reducing unbalance in a disc pack 9. In the present invention, a hole 20 is used of to create a known unbalance in the spindle motor 13. The known unbalance is determined by checking the assembled disc pack with a balance checking device. If the known unbalance does not fall within the maximum allowable unbalance of 30 mg.cm±15 mg.cm, a subsequent hole 22 is created in the motor hub to ensure that the total unbalance falls within the allowable range. In the event where more than one hole is created in the motor hub, the combination of the holes would provided a known unbalance that would fall within the allowable range of 30 mg.cm±15 mg.cm. The allowable unbalance has a displacement angle of ±30°. This combination provides the inventive feature which is adapted into a vector sum equation to determine the direction of biasing the disc 14 during the disc pack 9 assembly.

Figure 4:
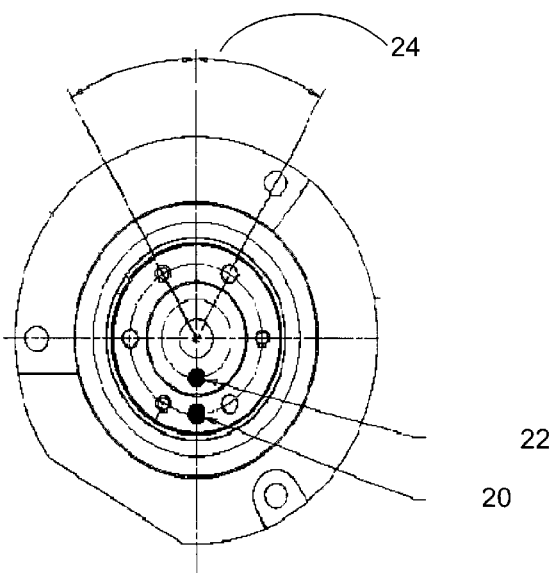
FIG. 4 is a top view of the spindle motor of the present invention.

FIG. 4 shows the top view of the disc pack 9 with the feature where more than one hole, 20 and 22 were created in the spindle motor 13. Both holes 20 and 22 are aligned and the angle of allowable unbalance 24 is suspended directly opposite the feature. The direction of biasing the disc 14 is determined using a vector sum of the vector components of the unbalance in the spindle motor 13 and the disc 14.

Figure 5:
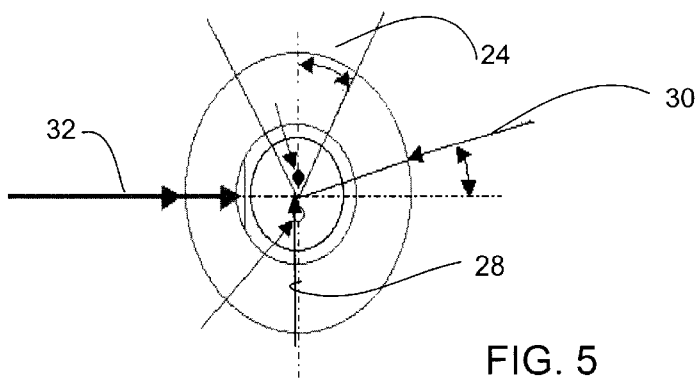
FIG. 5 is a vector diagram of the unbalance of the disc, the spacer and the spindle motor of the present invention.

The vector components in a single disc drive are illustrated in FIG. 5. The known unbalance of the spindle motor 13 is represented by the vector 28. The unbalance of the first disc is represented by the vector 30 while the unbalance of the second disc or spacer is represented by the vector 32. With the unbalance of the spindle motor and one other fixed component, the present invention provides for the direction of the remaining third component to be determined. The fixed vector component is the spacer in this embodiment. Using the known unbalance of the spindle motor 13, the overall unbalance of the disc pack 9 is reduced further as compared to prior methods where this unbalance of the spindle motor is not taken into consideration.

Figure 6:
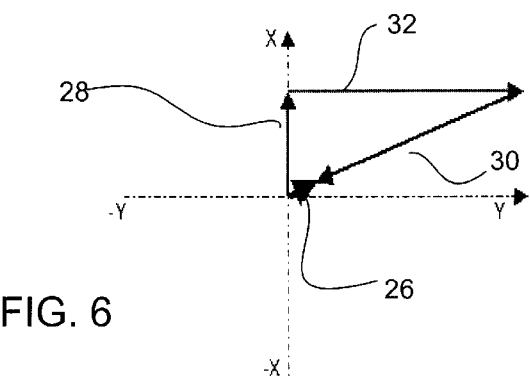
FIG. 6 is a vector sum diagram showing the resultant vector where the unbalance of the spindle motor is taken into consideration during the biasing of the components of the disc pack.

FIG. 6 shows a vector sum of the components 28, 30 and 32 where the resultant unbalance 26 falls within the range of the allowable unbalance.

Figure 7:
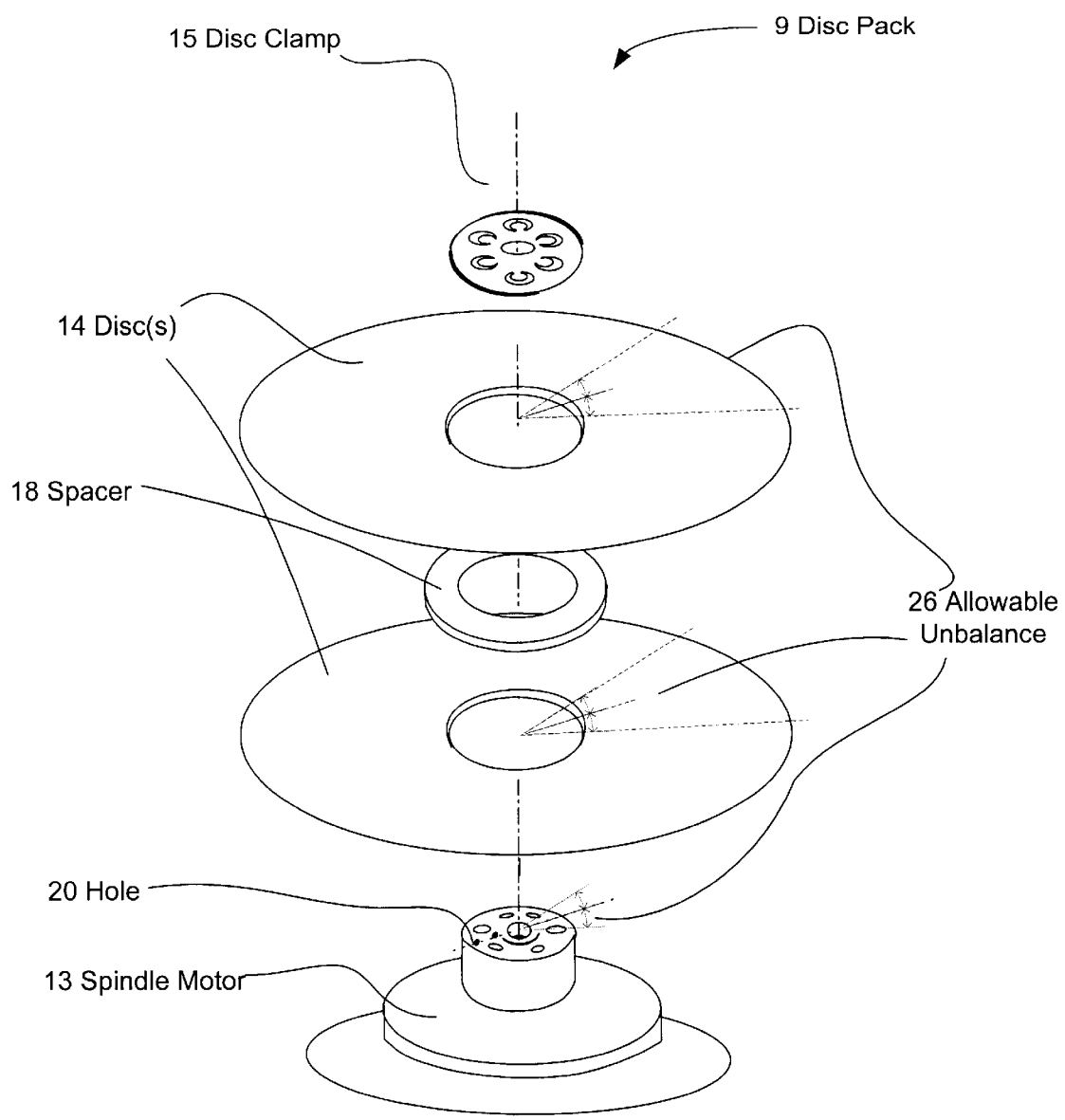
FIG. 7 is an exploded view of another embodiment of the present invention.

FIG. 7 shows another embodiment of the present invention where there is more than one disc in the disc pack. The biasing positions of a pair of discs 14 and the spacer 18 are mounted to the spindle motor 13 in a disc pack assembly. The biasing direction of each additional pair of vector components, is identical to the first pair of vector components 30 and 32 described above. In this embodiment, the unbalance contributed by the spacer is negligible as compared to that contributed by the second disc. Therefore, the three components in the vector sum equation are the unbalance of the two discs and that of the spindle motor 13.

In other embodiments where there are multiple discs, the relationship between each pair of discs 14 and the spindle motor 13 is taken to be a single vector sum.

Various embodiments of the present invention are described below: In a disc pack 9 that has a spindle motor 13 with a hub 19, a disc 14, a spacer 18 and a disc clamp 15, a method is used to reduce unbalance in the disc pack 9. The steps of this method is categorized under two main steps, creating a known unbalance on the spindle motor 13 and biasing the disc 14 to achieve an allowable unbalance 24 with respect to the unbalance of the spindle motor. In creating a known unbalance on the spindle motor, the known unbalance is demarcated on the spindle motor and its direction determined. In biasing the discs 14, a vector sum is used to optimize the unbalance direction of the discs 14 and the spindle motor 13. The vector sum includes the components in the disc pack. The resultant 26 of the vector sum is set to fall within an allowable unbalance 24.

In order to determine the orientation of the unbalance in the spindle motor 13, a feature is provided. The feature to locate the motor hub 19 at a specific orientation during the biasing process is a hole 20 in the spindle motor 13, which will provide the known unbalance. The allowable balance 24 is set in the range of 30 mg.cm±15 mg.cm. In another embodiment, the present invention is applied to a disc drive 10 with a disc pack 9. The disc pack 9 has a spindle motor 13, a disc 14, a spacer 18 and a disc clamp 15 with screws to secure the disc to the spindle motor. The spindle motor 13 is provided a known unbalance, which is incorporated into the biasing process to minimize an allowable unbalance in the disc pack 9. The disc pack 9 with a known unbalance of the spindle motor 13 has a feature to provide orientation identification of the unbalance. The feature is a hole 20 to locate the motor hub 19 in a specific orientation during the biasing process. The known unbalance of the spindle motor 13 is set to fall directly opposite the feature within a range of ±30° about a line through the center of the hub 19 and the feature.

A single-disc disc drive 10 having a disc pack 9 which comprises one disc 14, a spacer 18 and a spindle motor 13 assembled by biasing the disc 14 and spacer 18 in directions determined by means of a vector sum equation of the unbalance of the spindle motor 13, spacer 18 and disc 14.

A disc drive 10 with multiple discs 14 in a disc pack 9, the disc pack also comprises spacers 18 between each pair of discs 14 and a spindle motor 13 assembled by biasing the discs pairs in directions determined by the means of vector sum equations of the unbalance of the spindle motor 13 and each pair of discs.

The foregoing description is only illustrative of various embodiments of the invention, and a person skilled in the art will understand that changes can be made to the details of structure, function and processes without going beyond the scope of the present invention.

What is claimed is:

1. A method of balancing a disc pack, the disc pack having a spindle motor with a hub and at least one disc disposed around the hub, wherein the method comprises steps of:
(a) supporting the motor so that the hub is rotatable around an axis;
(b) defining a feature in the hub establishing an asymmetrical distribution of the hub mass around the axis producing a shift in the center of hub mass from the axis;
(c) biasing the disc to balance the mass offset of the hub feature without altering the asymmetrical mass distribution of feature; and (d) clamping the disc in the biased position.

2. The method according to claim 1 wherein the feature comprises a hole in the hub.

3. A disc stack assembly comprising:

a spindle motor with a hub that is rotatable around an axis, the hub defining a feature establishing an asymmetrical distribution of the hub mass around the axis producing a shift in the center of hub mass from the axis:

a disc disposed around the hub and biased to balance the mass offset of the hub feature without altering the asymmetrical mass distribution of the feature.

4. The disc stack assembly according to claim 3 wherein the feature comprises a hole in the spindle motor.

5. The disc stack assembly according to claim 3 wherein the angle of an unbalance condition caused by the feature is disposed opposite the feature within a range of ±30° about a line through the center of the hub and the feature.

6. The disc stack assembly according to claim 3 wherein the feature comprises an indentation.

* * * * *